US008066571B2

(12) United States Patent
Koster et al.

(10) Patent No.: US 8,066,571 B2
(45) Date of Patent: Nov. 29, 2011

(54) SYSTEM AND METHOD FOR ENABLING CHARACTERS TO BE MANIFESTED WITHIN A PLURALITY OF DIFFERENT VIRTUAL SPACES

(75) Inventors: Raph Koster, San Diego, CA (US); John Donham, San Diego, CA (US); Sean Riley, San Diego, CA (US)

(73) Assignee: Metaplace, Inc., San Diego, CA (US)

( * ) Notice: Subject to any disclaimer, the term of this patent is extended or adjusted under 35 U.S.C. 154(b) by 731 days.

(21) Appl. No.: 12/135,854

(22) Filed: Jun. 9, 2008

(65) Prior Publication Data

US 2009/0307226 A1    Dec. 10, 2009

(51) Int. Cl.
  *A63F 13/00* (2006.01)
  *A63F 13/02* (2006.01)
  *A63F 13/12* (2006.01)
  *G06F 3/048* (2006.01)

(52) U.S. Cl. ............... 463/42; 463/43; 463/30; 715/706

(58) Field of Classification Search ............ 463/43, 463/42, 30, 39; 715/757, 706; 709/202; 345/473

See application file for complete search history.

(56) References Cited

U.S. PATENT DOCUMENTS

| | | | |
|---|---|---|---|
| 5,525,765 A | 6/1996 | Freiheit ........................... 181/30 |
| 5,736,982 A | 4/1998 | Suzuki et al. ................. 345/330 |
| 6,009,458 A * | 12/1999 | Hawkins et al. ............... 463/42 |
| 6,219,045 B1 * | 4/2001 | Leahy et al. ................... 715/757 |
| 6,323,857 B1 | 11/2001 | Mielekamp et al. .......... 345/419 |
| 6,493,001 B1 | 12/2002 | Takagi et al. ................. 345/759 |
| 6,791,549 B2 | 9/2004 | Hubrecht et al. ............ 345/473 |
| 6,961,060 B1 | 11/2005 | Mochizuki et al. ........... 345/473 |
| 7,534,169 B2 | 5/2009 | Amaitis et al. ................... 463/39 |
| 7,577,847 B2 | 8/2009 | Nguyen et al. ................ 713/186 |
| 7,587,338 B2 | 9/2009 | Owa ............................... 705/26 |
| 7,681,114 B2 | 3/2010 | Ambrosino et al. .......... 715/201 |

(Continued)

FOREIGN PATENT DOCUMENTS

EP    991009 A2 *    4/2000

(Continued)

OTHER PUBLICATIONS

James, Daniel, Gordon Walton, eds., et al., Persistent Worlds Whitepaper 2004 IGD Online Games SIG <archives.igda.org/online/IGDA_PSW_Whitepaper_2004.pdf>.*

(Continued)

*Primary Examiner* — Peter DungBa Vo
*Assistant Examiner* — Michael D Brothers
(74) *Attorney, Agent, or Firm* — Pillsbury Winthrop Shaw Pittman LLP

(57) ABSTRACT

A system and method for providing virtual spaces, where a character associated with a user can be manifested within instances of a plurality of the different virtual spaces. Since a single character can be manifested within instances of different virtual spaces, the character can be transferred by the corresponding user between instances of different virtual spaces and controlled by the user to interact with the different virtual spaces. When the user transfers the character between instances of different virtual spaces (and/or different types of virtual spaces), various aspects of the character may persist between the different virtual spaces (and/or the different types of virtual spaces). This may provide an enhanced continuity to the character between the different virtual spaces.

22 Claims, 2 Drawing Sheets

U.S. PATENT DOCUMENTS

| | | | |
|---|---|---|---|
| 7,788,323 B2 | 8/2010 | Greenstein et al. | 709/204 |
| 7,797,261 B2 | 9/2010 | Yang | 706/45 |
| 2002/0049814 A1 | 4/2002 | Yoo | 709/205 |
| 2002/0082910 A1 | 6/2002 | Kontogouris | 705/14 |
| 2002/0112033 A1 | 8/2002 | Doemling et al. | 709/219 |
| 2002/0169670 A1 | 11/2002 | Barsade et al. | 705/14 |
| 2003/0008713 A1 | 1/2003 | Ushiro et al. | 463/42 |
| 2003/0046689 A1 | 3/2003 | Gaos | 725/34 |
| 2003/0064705 A1 | 4/2003 | Desiderio | 455/412 |
| 2004/0014527 A1 | 1/2004 | Orr et al. | 463/43 |
| 2004/0230458 A1 | 11/2004 | Takayama et al. | 705/3 |
| 2005/0033511 A1 | 2/2005 | Pechatnikov et al. | 701/210 |
| 2005/0091111 A1 | 4/2005 | Green et al. | 705/14 |
| 2005/0160141 A1 | 7/2005 | Galley et al. | 709/204 |
| 2005/0210395 A1 | 9/2005 | Wakita et al. | 715/753 |
| 2006/0015814 A1 | 1/2006 | Rappaport et al. | 715/733 |
| 2006/0211462 A1 | 9/2006 | French et al. | 463/1 |
| 2007/0020603 A1 | 1/2007 | Woulfe | 434/350 |
| 2007/0021213 A1* | 1/2007 | Foe et al. | 463/42 |
| 2007/0050716 A1 | 3/2007 | Leahy et al. | 715/706 |
| 2007/0082738 A1* | 4/2007 | Fickie et al. | 463/42 |
| 2007/0190494 A1 | 8/2007 | Rosenberg | 434/11 |
| 2007/0288598 A1 | 12/2007 | Edeker et al. | 709/217 |
| 2008/0052054 A1 | 2/2008 | Beverina et al. | 703/6 |
| 2008/0082311 A1 | 4/2008 | Meijer et al. | 703/24 |
| 2008/0094417 A1 | 4/2008 | Cohen | 345/632 |
| 2008/0134056 A1 | 6/2008 | Shuster | 715/757 |
| 2009/0077158 A1 | 3/2009 | Riley et al. | 709/202 |
| 2009/0077463 A1 | 3/2009 | Koster | 715/234 |
| 2009/0077475 A1 | 3/2009 | Koster et al. | 715/757 |
| 2009/0307611 A1 | 12/2009 | Riley | 715/757 |
| 2010/0058235 A1 | 3/2010 | Borst | 715/810 |
| 2010/0095213 A1 | 4/2010 | Koster et al. | 715/733 |

FOREIGN PATENT DOCUMENTS

| | | |
|---|---|---|
| WO | WO 2005015505 A1 * | 2/2005 |
| WO | WO 2009/039080 | 3/2009 |
| WO | WO 2009/039084 | 3/2009 |
| WO | WO 2009/039085 | 3/2009 |
| WO | WO 2009/152074 | 12/2009 |
| WO | WO 2009/152077 | 12/2009 |
| WO | WO 2010/042783 | 4/2010 |

OTHER PUBLICATIONS

WoWWiki, Paid Character Transfer FAQ (US) Feb. 23, 2007, Blizzard Entertainment <www.wowwiki.com/Paid_Character_Transfer_FAQ_(US)>.*

Linden Research, Inc., Second Life Wiki: Second Life Work/FAQs Nov. 9, 2009, Linden Research, Inc. <http://wiki.secondlife.com/wiki/Second_Life_Work/FAQs>.*

Blizzard Entertainment, Inc., World of Warcraft Manual 2004, Blizzard Entertainment <willishome.com/Manual.pdf>.*

Kumar, S.; Chhugani, J.; Changkyu Kim; Daehyun Kim; Nguyen, A.; Dubey, P.; Bienia, C.; Youngmin Kim; , "Second Life and the New Generation of Virtual Worlds," Computer , vol. 41, No. 9, pp. 46-53, Sep. 2008 doi: 10.1109/MC.2008.398 <http://ieeexplore.ieee.org/stamp/stamp.jsp?tp=&arnumber=4623222&isnumber=4623205>.*

Wilson, Tracy V.. "How World of Warcraft Works" Nov. 16, 2007. HowStuffWorks.com. <http://electronics.howstuffworks.com/world-of-warcraft.htm> Apr. 13, 2011.*

* cited by examiner

SYSTEM AND METHOD FOR ENABLING CHARACTERS TO BE MANIFESTED WITHIN A PLURALITY OF DIFFERENT VIRTUAL SPACES

RELATED APPLICATIONS

This application is related to U.S. patent application Ser. No. 11/898,864, entitled "System For Providing Virtual Spaces For Access By Others," and filed Sep. 17, 2007 now pending; U.S. patent application Ser. No. 11/898,863, entitled "System For Providing Virtual Spaces With Separate Places And/Or Acoustic Areas," and filed Sep. 17, 2007 now pending; U.S. patent application Ser. No. 11/898,861, entitled "System And Method For Embedding A View Of A Virtual Space In A Banner Ad And Enabling User Interaction With The Virtual Space Within The Banner Ad," and filed Sep. 17, 2007 now pending; and U.S. patent application Ser. No. 12/135,832, entitled "System and Method Of Providing Access To Virtual Spaces That Are Associated With Physical Analogues In The Real World," and filed herewith; all of which are hereby incorporated by reference into this disclosure in their entirety.

FIELD OF THE INVENTION

The invention relates to systems and methods for providing virtual spaces wherein individual characters can be manifested within instances of a plurality of different virtual spaces.

BACKGROUND OF THE INVENTION

Systems that provide virtual worlds and/or virtual gaming spaces accessible to a plurality of users for real-time interaction are known. Such systems tend to be implemented with some rigidity with respect to the characteristics of the virtual worlds that they provide. As a result interaction with and/or between a plurality of the virtual worlds and/or virtual gaming spaces tend to be limited.

For example, some virtual worlds are configured such that instances of the virtual worlds manifest characters that are controlled by users accessing the virtual worlds. Controlling a character within a virtual world may provide the primary mechanism through which the user interacts with the virtual world. Due to the relatively rigid, monolithic nature of conventional virtual worlds, it may not be practicable for a character within one virtual world to be enter another virtual world by being manifested within an instance of the virtual world with manifestation characteristics (e.g., appearance, etc.), parameter information (e.g., score, inventory, social connections, etc.), inventory (e.g., objects, currency, etc.), and/or other information that is persistent between the different virtual worlds. Instead, a user may be required to create separate characters within the different virtual worlds.

Conventional video gaming systems exist where a user may create an avatar, or visual representation, that can be expressed within a plurality of different games. For example, the Wii system from Nintendo enables users to create "Miis," which are digital representations of people that can be expressed within a plurality of different games that are played on the Wii system. However, in the Wii system and/or other similar conventional systems the avatars created and/or obtained by a user are only stored locally on a gaming console where an application that is specific to a game being played is executed. As such, characters cannot be accessed from other consoles or terminals unless a storage device (memory card, hard drive) is physically moved from one console to another; there exists no centralized storage usable by any networked device, including possible applications such as Internet-facing presentation of the character data via a web browser. Further, outside of the visual representation of avatars like Miis, conventional systems enable little to no information related to the avatars to be persistent between different games.

SUMMARY

One aspect of the invention may relate to a system and method for providing virtual spaces, where a character associated with a user can be manifested within instances of a plurality of the different virtual spaces. Since a single character can be manifested within instances of different virtual spaces, the character can be transferred by the corresponding user between instances of different virtual spaces and controlled by the user to interact with the different virtual spaces. When the user transfers the character between instances of different virtual spaces (and/or different types of virtual spaces), various aspects of the character may persist between the different virtual spaces (and/or the different types of virtual spaces). This may provide an enhanced continuity to the character between the different virtual spaces.

A character may be manifested within an instance of one of the virtual spaces as an object, such as, for example, an avatar, through which the user may interact with the instance of the virtual space. For example, the character may be controlled by the user to move about within the instance, interact with one or more other objects within the instance, communicate with other objects (e.g., characters associated with other users), fight other objects, race other objects, observe and/or interact with topography within the instance of the virtual space, and/or otherwise interact with the virtual space.

In certain implementations, a given virtual space (or group of virtual spaces) may require information related to the character to manifest the character that does not persist between the given virtual space (or group of spaces) and other ones of the virtual spaces. For example, the given virtual space (or group of virtual spaces) may require characters to appear as a certain type of creature (e.g., a dragon, an elf, a wizard, soldier, etc.), while other ones of the virtual spaces permit other types of visual representations of characters. As another example, the given virtual space (or group of virtual spaces) may have a scoring system and may associate the character with a "score" that is earned during game play, while other ones of the virtual spaces may not associate characters with a score. In order to enable relatively seamless traversal between the virtual spaces by the character, the system and/or method may enable the character to be configured upon entry into the given virtual space such that information that is persistent between the given virtual spaces and the other virtual spaces for the character is implemented to manifest the character in an instance of the given virtual space, along with information that is specific to the given virtual space (or group of virtual spaces), while information related to the character with respect to other virtual spaces may be disregarded if it is not persistent within the given virtual space.

In some implementations, the system may include one or more of a storage module, one or more servers, one or more clients, and/or other components. The system may be configured such that information related to virtual spaces and/or characters may be transmitted from the storage module to the servers, which may then execute instances of the virtual spaces and may manifest characters within the instances of the virtual spaces based on the information received from the storage module. From an instance of a virtual space, a server may generate a view of the virtual space, and transmit the view to a client in the form of view information. The client may assemble the view from the received view information, and may present a display of the view to a user. Via an interface provided on the client, the user may control a manifestation of a character associated with the user within the instances of the virtual spaces.

The storage module may be remote from one or both of the server and/or the client. The storage module may store one or more character records, which correspond to individual characters. Some or all of the information included within a given character record may be persistent between different virtual spaces and/or different types of virtual spaces. As such, the character records stored by the storage module may include information that enables individual characters to be manifested within a plurality of the virtual spaces, including different types of virtual spaces. This may enable a user to transfer her character between virtual spaces with some degree of continuity. The information included within a given character record may include one or more of manifestation information that is specific to the corresponding character, character parameter information, character inventory information, character interface information, and/or other information related to the corresponding character.

In some implementations, a manifestation of a character may include the locomotion characteristics of the character, the size of the character, the strength of the character, the weight of the character, the visual representation of the character, the identity and/or nature of the character, interaction characteristics of the character, movement characteristics of the character, sonic characteristics of the character, a character type or class (e.g., human, animal, alien, warrior, priest, tradesman, etc.), and/or other aspects of the manifestation of the character. The interaction characteristics of a character described by the manifestation information within the corresponding character record may include information related to the manner in which the character interacts with and/or is influenced by other objects and/or characters within the virtual spaces, the topography (e.g., features of the topography) of virtual spaces, unseen forces in the virtual spaces, and/or other characteristics of the manner in which the character interacts with outside forces, objects, and/or characters in the virtual spaces.

In some implementations, character parameter information may include information related to parameters of a character within one or more of the virtual spaces. By way of non-limiting example, the character parameter information may include information related to one or more of an acquired skill of the character, a skill level of the character, a status of the character, a social connection or friendship between the character and one or more other characters, a score achieved by the character, a permission afforded to the character (e.g., to access a restricted area in a virtual space, to access a restricted virtual space, etc.), and/or other parameters of the character.

One or more of the parameters represented by the character parameter information may be persistent between a plurality of the virtual spaces and/or virtual space types. This may enable parameters gained in one virtual space to be transferred into another virtual space, even where the other virtual space is of a different virtual space type. One or more of the parameters represented by the character parameter information may not be persistent between all of the virtual spaces and/or virtual space types. However, in such implementations, the information related to these parameters may be stored on a per space, and/or per set of spaces (e.g., grouped according to virtual space type, grouped according to a common scheme or theme, etc.), basis. This may enable the character to leave a first virtual space and/or first set of virtual spaces, within which a given parameter is persistent, to enter a second virtual space (or virtual spaces) without maintaining the persistent representation of the parameter, and upon return to the first virtual space (or first set of virtual spaces) the representation of the parameter stored for the first virtual space (or first set of virtual spaces) is restored to the character. In some of these implementations, the character record may include different representations of the same parameter (or similar parameters) for the first virtual space (or first set of virtual spaces) and the second virtual space (or virtual spaces).

As should be appreciated from the foregoing, parameters of a character may be altered in one virtual space, for example, due to achievement within the virtual space. As a non-limiting example, in a first virtual space the character may gain and/or enhance a skill that may be useful in another virtual space and/or type of virtual space. Since the character parameter that represents this parameter (i.e., the skill) may be persistent between a plurality of virtual spaces, when the character moves from the virtual space in which the skill was gained and/or enhanced to another one of the virtual spaces in which the skill is a parameter, even if the character has passed through other virtual spaces in which the skill was not a parameter, the skill will be represented at the gained and/or augmented level. This may provide an enhanced continuity to the virtual spaces provided by the system.

In some implementations, character inventory information may include information related to an amount of virtual currency currently possessed by the character, information related to objects in the possession and/or under the control of the character, and/or other information related to an inventory associated with the character. At least a portion of the character inventory information may be persistent between different virtual spaces and/or types of virtual spaces. This may enable the character to take her "possessions" with her between the various virtual spaces.

In some implementations, character interface information may include information related to an interface provided to the user that enables the user to control a character within the virtual spaces. For example, the character interface information included in a given character record may include information that configures an input device provided at the client to control the character that corresponds to the given character record in a predetermined manner. The information that configures the input device may include a mapping of the input device provided at the client to commands that can be input to the system to control the character in a predetermined manner. The input device may include, for example, a keyboard, a mouse, a joystick, a trackball, and/or other input devices.

In some implementations, the character interface information may include information that configures a display of information related to the character. For example, the character interface information may include information that configures a display provided to the user at the client. This may include configuring one or more of the type of information that is displayed, the position of the information on a display, the size of the information on the display, and/or other manners of configuring a display of information related to the character.

In some implementations, the character interface information may include information that configures a graphical user interface related to the character. For example, the graphical user interface may display information related to the character and/or enable control of the character. Configuring a graphical user interface may include one or more of determining the size and/or location of displays of information related to the character, determining information related to the commands that can be input through the graphical user interface, determining the manner in which the commands that can be input through the graphical user interface are selected, and/or determining other parameters of the graphical user interface.

A server executing an instance of a virtual space may include an instantiation module, a view module, a character module, and/or other modules. The instantiation module may obtain information from the storage module that enables the instantiation module to execute the instance of the virtual space. The view module may determine a view of the instance of the virtual space that is transmitted to the client for display to a user on the client. The character module may obtain and/or manage information related to a character associated with the user so that the character can be manifested within the instance of the virtual space and/or instances of other virtual spaces.

In some implementations, the character module may receive information related to a character introduced into the instance by the user (e.g., via the client). For example, in order to "enter" the instance of the virtual space, the client may transmit a request to the server for access to the instance. The request may include an identification that enables the character module to determine a character that should be manifested within the instance as a representation of the user. Determination of the character by the character module may include identifying a character record from which information related to the character can be accessed. The character record may correspond to the identification received by the character module in the request from the client. The character module may then obtain information from the appropriate character record that will enable the instantiation module to manifest the character within the instance of the virtual space and/or will enable the view module to determine the appropriate view of the instance of the virtual space for transmission to the client.

As has been set forth above, the information within the character record accessed by the character module may include one or more of manifestation information that is specific to the character, character parameter information, character inventory information, character interface information, and/or other information related to the character. At least some of the information within the character record may be persistent between the instance of the virtual space being executed by the server and instances of other virtual spaces. However, this may not be the case for some of the information within the character record. Some of the information within the character record may be specific to the virtual space of the instance being executed (and/or some group of virtual spaces of which the virtual space of the instance being executed is a part). For example, aspects of the visual representation of the character may be specific to the virtual space and/or group of virtual spaces, objects and/or currency in the inventory of the character may be specific to the virtual space and/or group of virtual spaces, a score, a skill, a skill level, a permission, a social connection, and/or other parameters of the character may be specific to the virtual space and/or group of virtual spaces, and/or other information included in the character record may be specific to the virtual spaces and/or group of virtual spaces.

According to various embodiments of the invention, if a character is being introduced into a virtual space (e.g., manifested into an instance of the virtual space) for the first time, the character record may not include all of the information necessary to manifest the character in an instance of the virtual space. For example, the virtual space may be configured such that some of the information within the character record is specific to the virtual space and, if the character has not been introduced into the virtual space before this information may not have been entered yet to the character record. In such cases, the character module may enable the user to configure the character for the virtual space so that the character record corresponding to the character includes all of the information for manifesting the character in the instance being executed by the server.

In some implementations, information related to the character may change and/or evolve during the presence of the character within the instance of the virtual space being executed by the server. For example, the appearance of the character may change, the character may acquire and/or enhance one or more skills, the character may obtain currency and/or objects, a score associated with the character may changed, manifestation information associated with the character may change (e.g., the character may grow, become injured, get stronger, etc.), the character may gain a permission, the character may make a new social connection or enhance an existing social connection, and/or other information associated with the character may change. These changes may happen spontaneously within the instance being executed (e.g., the instance may cause the visual representation of the character to mature over time), may be caused by game-play within the instance, may be caused by customization and/or configuration input by the user (via the client), and/or may have other causes. The character module may manage the storage of these changes in the character record. These changes may be stored within the character record so that if the character leaves the instance being executed by the server and enters another virtual space, information related to the character that is persistent between the instance being executed and instances of the other virtual spaces will cause the changes to be reflected in the other virtual spaces. If the information related to the character that is changed within the instance being executed is not persistent between the virtual space of the instance being executed and the other virtual space, then these changes will be stored within the character record until the character re-enters the instance being executed and/or an instance of some other virtual space for which the changed information is persistent.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a pair of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
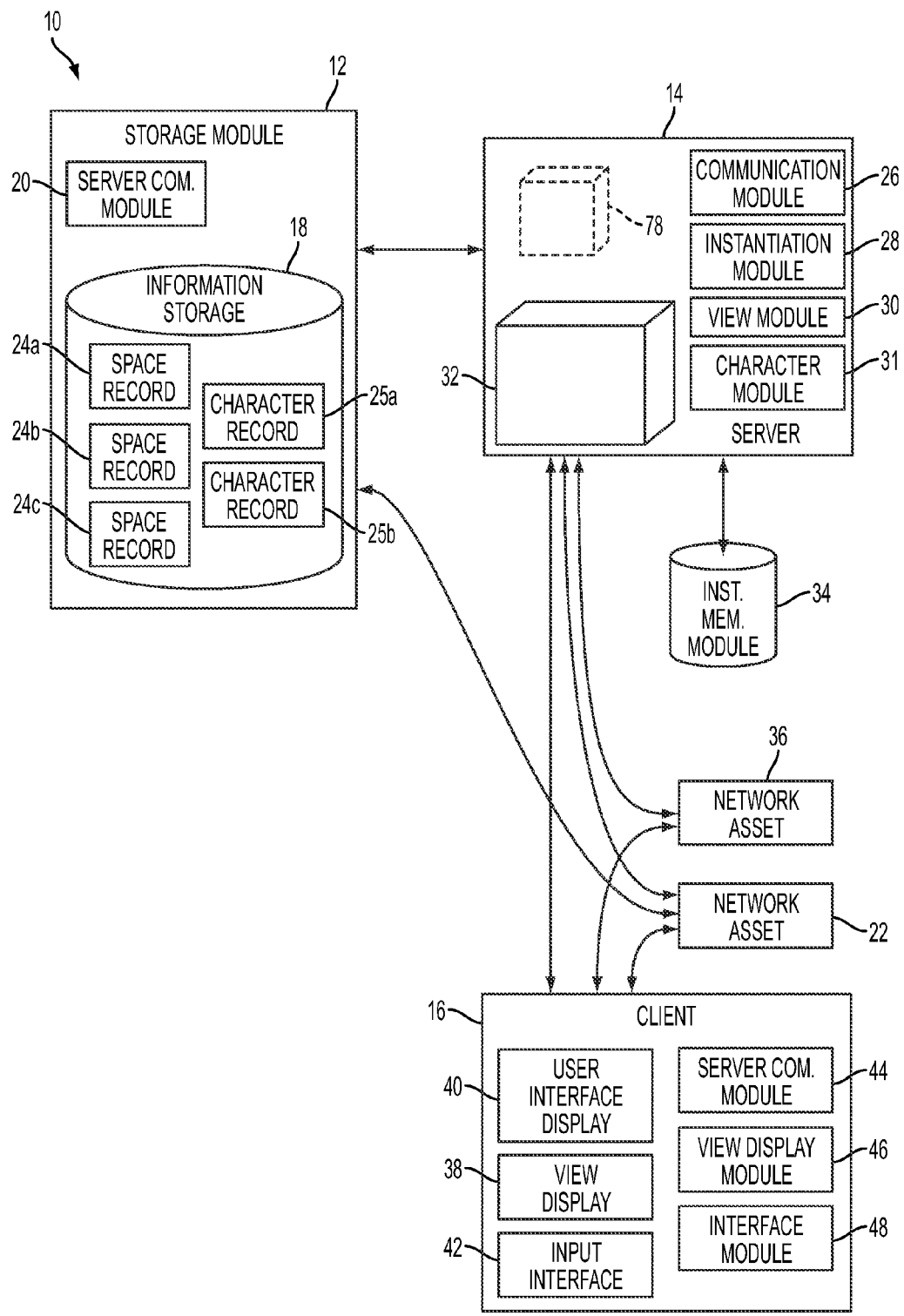
FIG. 1 illustrates a system configured to provide one or more virtual spaces that may be accessible to users, according to one or more embodiments of the invention.

FIG. 1 illustrates a system 10 configured to provide one or more virtual spaces that may be accessible to users. In some embodiments, system 10 may include a storage module 12, a server 14, a client 16, and/or other components. Storage module 12, server 14, and client 16 may be in operative communication with each other. System 10 may be configured such that information related to a given virtual space may be transmitted from storage module 12 to server 14, which may then execute an instance of the virtual space. Views of the virtual space may be generated by server 14 from the instance of the virtual space. Information related to the views may be transmitted from server 14 to client 16 to enable client 16 to format the views for display to a user.

In some embodiments, system 10 may enable a user to control a character within an instance of a virtual space. The character may be manifested within the instance of the virtual space as an object, such as, for example, an avatar, through which the user may interact with the instance of the virtual space. For example, the character may be controlled by the user to move about within the instance, interact with one or more other objects within the instance, communicate with other objects (e.g., characters associated with other users), fight other objects, race other objects, observe and/or interact with topography within the instance of the virtual space, and/or otherwise interact with the virtual space. System 10 may further be configured such that the character can be transferred by the user between instances of different virtual spaces (including different types of virtual spaces). When the user transfers the character between instances of different virtual spaces (and/or different types of virtual spaces), various aspects of the character may persist between the different virtual spaces (and/or the different types of virtual spaces).

System 10 may implement a markup language for communication between components (e.g., storage module 12, server 14, client 16, etc.). Information may be communicated between components via markup elements of the markup language. By virtue of communication between the components of system 10 in the markup language, various enhancements may be achieved. For example, information may be transmitted from storage module 12 to server 14 that configures server 14 to execute an instance of the virtual space may be provided to server 14 via the markup language at or near the time of instantiation. Similarly, information transmitted from server 14 to client 16 may enable client 16 to generate views of the virtual space by merely assembling the information indicated in markup elements communicated thereto. The implementation of the markup language may facilitate the execution of instances of various types of virtual spaces by system 10. The types of virtual spaces may include, for example, two-dimensional spaces, three-dimensional spaces, gaming spaces, social spaces, first-person spaces, third-person spaces, spaces that draw from different genres, action gaming spaces, role-playing spaces, and/or other types of spaces. The implementation of the markup language may facilitate creation of a new virtual space by the user of client 16, and/or the customization/refinement of existing virtual spaces.

As used herein, a virtual space may comprise a simulated space (e.g., a physical space) instanced on a server (e.g., server 14) that is accessible by a client (e.g., client 16) located remotely from the server, to format a view of the virtual space for display to a user of the client. The simulated space may have a topography, express real-time interaction by the user, and/or include one or more objects positioned within the topography that are capable of locomotion within the topography. In some implementations, the topography may be a 2-dimensional topography. In other instances, the topography may be a 3-dimensional topography. In some implementations, the topography may be a single node. The topography may include dimensions of the virtual space, and/or surface features of a surface or objects that are "native" to the virtual space. In some implementations, the topography may describe a surface (e.g., a ground surface) that runs through at least a substantial portion of the virtual space. In some implementations, the topography may describe a volume with one or more bodies positioned therein (e.g., a simulation of gravity-deprived space with one or more celestial bodies positioned therein). A virtual space may include a virtual world, but this is not necessarily the case. For example, a virtual space may include a game space that does not include one or more of the aspects generally associated with a virtual world (e.g., gravity, a landscape, etc.). By way of illustration, the well-known game Tetris may be formed as a two-dimensional topography in which bodies (e.g., the falling tetrominoes) move in accordance with predetermined parameters (e.g., falling at a predetermined speed, and shifting horizontally and/or rotating based on user interaction).

As used herein, the term "markup language" may include a language used to communicate information between components via markup elements. Generally, a markup element is a discrete unit of information that includes both content and attributes associated with the content. The markup language may include a plurality of different types of elements that denote the type of content and the nature of the attributes to be included in the element. For example, in some embodiments, the markup elements in the markup language may be of the form [O_HERE]|objectId|artIndex|x|y|z|name|templateId. This may represent a markup element for identifying a new object in a virtual space. The parameters for the mark-up element include: assigning an object Id for future reference for this object, telling the client what art to draw associated with this object, the relative x, y, and z position of the object, the name of the object, and data associated with the object (comes from the template designated). As another non-limiting example, a mark-up element may be of the form [O_GONE]|objId. This mark-up element may represent an object going away from the perspective of a view of the virtual space. As yet another example, a mark-up element may be of the form [O_MOVE] objectId|x|y|z. This mark-up element may represent an object that has teleported to a new location in the virtual space. As still another example, a mark-up element may be of the form [O_SLIDE]|objectId|x|y|z|time. This mark-up element may represent an object that is gradually moving from one location in the virtual space to a new location over a fixed period of time. It should be appreciated that these examples are not intended to be limiting, but only to illustrate a few different forms of the markup elements.

Storage module 12 may include information storage 18, a server communication module 20, and/or other components. Generally, storage module 12 may store information related to one or more virtual spaces. The information stored by storage module 12 that is related to a given virtual space may include topographical information related to the topography of the given virtual space, manifestation information related to the manifestation of one or more objects positioned within the topography and/or unseen forces experienced by the one or more objects in the virtual space, interface information related to an interface provided to the user that enables the user to interact with the virtual space, space parameter information related to parameters of the virtual space, and/or other information related to the given virtual space.

The manifestation of the one or more objects may include the locomotion characteristics of the one or more objects, the size of the one or more objects, the identity and/or nature of the one or more objects, interaction characteristics of the one or more objects, and/or other aspect of the manifestation of the one or more objects. The interaction characteristics of the one or more objects described by the manifestation information may include information related to the manner in which individual objects interact with and/or are influenced by other objects, the manner in which individual objects interact with and/or are influenced by the topography (e.g., features of the topography), the manner in which individual objects interact with and/or are influenced by unseen forces within the virtual space, and/or other characteristics of the interaction between individual objects and other forces and/or objects within the virtual space. The interaction characteristics of the one or more objects described by the manifestation information may include scriptable behaviors and, as such, the manifestation stored within storage module 12 may include one or both of a script and a trigger associated with a given scriptable behavior of a given object (or objects) within the virtual space. The unseen forces present within the virtual space may include one or more of gravity, a wind current, a water current, an unseen force emanating from one of the objects (e.g., as a "power" of the object), and/or other unseen forces (e.g., unseen influences associated with the environment of the virtual space such as temperature and/or air quality).

In some embodiments, the manifestation information may include information related to the sonic characteristics of the one or more objects positioned in the virtual space. The sonic characteristics may include the emission characteristics of individual objects (e.g., controlling the emission of sound from the objects), the acoustic characteristics of individual objects, the influence of sound on individual objects, and/or other characteristics of the one or more objects. In such embodiments, the topographical information may include information related to the sonic characteristics of the topography of the virtual space. The sonic characteristics of the topography of the virtual space may include acoustic characteristics of the topography, and/or other sonic characteristics of the topography.

According to various embodiments, content included within the virtual space (e.g., visual content formed on portions of the topography or objects present in the virtual space, objects themselves, etc.) may be identified within the information stored in storage module 12 by reference only. For example, rather than storing a structure and/or a texture associated with the structure, storage module 12 may instead store an access location at which visual content to be implemented as the structure (or a portion of the structure) or texture can be accessed. In some implementations, the access location may include a URL that points to a network location. The network location identified by the access location may be associated with a network asset 22. Network asset 22 may be located remotely from each of storage module 12, server 14, and client 16. For example, the access location may include a network URL address (e.g., an internet URL address, etc.) at which network asset 22 may be accessed.

It should be appreciated that not only solid structures within the virtual space may be identified in the information stored in storage module 12 may be stored by reference only. For example, visual effects that represent unseen forces or influences may be stored by reference as described above. Further, information stored by reference may not be limited to visual content. For example, audio content expressed within the virtual space may be stored within storage module 12 by reference, as an access location at which the audio content can be accessed. Other types of information (e.g., interface information, space parameter information, etc.) may be stored by reference within storage module 12.

The interface information stored within storage module 12 may include information related to an interface provided to the user that enables the user to interact with the virtual space. More particularly, in some implementations, the interface information may include a mapping of an input device provided at client 16 to commands that can be input by the user to system 10. For example, the interface information may include a key map that maps keys in a keyboard (and/or keypad) provided to the user at client 16 to commands that can be input by the user to system 10. As another example, the interface information may include a map that maps the inputs of a mouse (or joystick, or trackball, etc.) to commands that can be input by the user to system 10. In some implementations, the interface information may include information related to a configuration of an interface display provided to the user at client 16, through which the user may input information to system 10. For example, the interface display may receive communication to other users interacting with the virtual space, input dictating actions to be performed by one or more objects within the virtual space, a request for a different point of view for the view, a request for a more (or less) sophisticated view (e.g., a 2-dimensional view, a 3-dimensional view, etc.), a request for one or more additional types of data to be displayed in the interface display, and/or other information.

The interface display may be configured (e.g., by the interface information stored in storage module 12) to provide information to the user about conditions in the virtual space that may not be apparent simply from viewing the space. For example, such conditions may include the passage of time, ambient environmental conditions, and/or other conditions. The interface display may be configured (e.g., by the interface information stored in storage module 12) to provide information to the user about one or more objects within the space. For instance, information may be provided to the user about objects associated with the topography of the virtual space (e.g., coordinate, elevation, size, identification, age, status, etc.). In some implementations, information may be provided to the user about objects that represent animate characters (e.g., wealth, health, fatigue, age, experience, etc.). For example, such information may be displayed that is related to an object that represents a character associated with client 16 in the virtual space (e.g., an avatar, a character being controlled by the user, etc.).

The space parameter information may include information related to one or more parameters of the virtual space. Parameters of the virtual space may include, for example, the rate at which time passes, dimensionality of objects within the virtual space (e.g., 2-dimensional vs. 3-dimensional), permissible views of the virtual space (e.g., first person views, bird's eye views, 2-dimensional views, 3-dimensional views, fixed views, dynamic views, selectable views, etc.), and/or other parameters of the virtual space. In some implementations, the space parameter information includes information related to the game parameters of a game provided within the virtual space. For instance, the game parameters may include information related to a maximum number of players, a minimum number of players, the game flow (e.g., turn based, real-time, etc.), scoring, spectators, and/or other game parameters of a game.

The information related to the plurality of virtual spaces may be stored in an organized manner within information storage 18. For example, the information may be organized into a plurality of space records 24 (illustrated as space record 24*a*, space record 24*b*, and space record 24*c*). Individual ones of space records 24 may correspond to individual ones of the plurality of virtual spaces. A given space record 24 may include information related to the corresponding virtual space. In some embodiments, the space records 24 may be stored together in a single hierarchal structure (e.g., a database, a file system of separate files, etc.). In some embodiments, space records 24 may include a plurality of different "sets" of space records 24, wherein each set of space records includes one or more of space records 24 that is stored separately and discretely from the other space records 24.

Information storage 18 may store information related to one or more characters that can be manipulated by users to interact with the virtual spaces. The information may be organized into one or more character records 25, which correspond to individual characters. In some implementations, character record 25 corresponding to a given character may be included within a user record (not shown) that includes information related to a user that is associated with the character. In such implementations, a single user record may include one or more character records 25. For example, where a single user has several characters that can optionally be employed by the user to interact with one or more virtual spaces provided by system 10, a single user record may include a character record that corresponds to each of the individual characters associated with the user. In other implementations, character records 25 may be maintained separately from user records, and associations between characters and users may be recorded by references between character records 25 and user records. For instance, in cases where a single use has several characters that can be employed by the user to interact with one or more virtual spaces provided by system 10, a single user record may include references to each of character records 25 that correspond to the user's characters.

Some or all of the information included within a given character record 25 may be persistent between different virtual spaces and/or different types of virtual spaces. As such, character records 25 may store information that enables individual characters to be manifested within a plurality of the virtual spaces, including different types of virtual spaces. This may enable a user to transfer her character between virtual spaces with some degree of continuity. The information included within a given character record 25 may include one or more of manifestation information that is specific to the corresponding character, character parameter information, character inventory information, character interface information, and/or other information related to the corresponding character.

In some implementations, a manifestation of a character may include the locomotion characteristics of the character, the size of the character, the strength of the character, the weight of the character, the visual representation of the character, the identity and/or nature of the character, interaction characteristics of the character, movement characteristics of the character, sonic characteristics of the character, a character type or class (e.g., human, animal, alien, warrior, priest, tradesman, etc.), and/or other aspects of the manifestation of the character. The interaction characteristics of a character described by the manifestation within the corresponding character record 25 may include information related to the manner in which the character interacts with and/or is influenced by other objects and/or characters within the virtual spaces, the topography (e.g., features of the topography) of virtual spaces, unseen forces in the virtual spaces, and/or other characteristics of the manner in which the character interacts with outside forces, objects, and/or characters in the virtual spaces. The interaction characteristics of the character may include scriptable behaviors. Accordingly, the manifestation information stored for a given character in the corresponding character record 25 may include one or both of a script and/or a trigger associated with a given scriptable behavior of the character within virtual space.

In some implementations, some or all of the manifestation information associated with a given character may be shared in common between the given character and a group of other characters, of which the given character is a part. In such implementations, character record 25 may include the common manifestation information by reference to a record on information storage 18 that includes the common manifestation information. For example, if a group of characters known as "elves" exist with a predetermined set of interaction characteristics, these interaction characteristics may be identified in a character record 25 corresponding to an elf character by referencing some record on information storage 18 that includes the predetermined set of interaction characteristics that are common to elf characters.

As was the case generally with content found in the virtual spaces, certain content associated with a character (e.g., a texture, an object, an overall appearance of the character, a script describing motion of the character, etc.) may be identified within the corresponding character record 25 by reference only. Such content maybe referenced by an access location (e.g., a URL, another record on information storage 18, etc.) at which the content can be accessed.

Some or all of the manifestation information within a given character record 25 may be persistent between a plurality of different virtual worlds, and/or virtual world types. As is discussed further below, some of the manifestation information within character record 25 may not be persistent between all of the virtual spaces provided by system 10.

In some implementations, character parameter information may include information related to parameters of a character within one or more of the virtual spaces. By way of non-limiting example, the character parameter information may include information related to one or more of an acquired skill of the character, a skill level of the character, a status of the character, a social connection or friendship between the character and one or more other characters, a score achieved by the character, a permission afforded to the character (e.g., to access a restricted area in a virtual space, to access a restricted virtual space, etc.), and/or other parameters of the character.

One or more of the parameters represented by the character parameter information may be persistent between a plurality of the virtual spaces and/or virtual space types. This may enable parameters gained in one virtual space to be transferred into another virtual space, even where the other virtual space is of a different virtual space type. One or more of the parameters represented by the character parameter information may not be persistent between all of the virtual spaces and/or virtual space types. However, in such implementations, the information related to these parameters may be stored on a per space, and/or per set of spaces (e.g., grouped according to virtual space type, grouped according to a common scheme or theme, etc.), basis. This may enable the character to leave a first virtual space and/or first set of virtual spaces, within which a given parameter is persistent, to enter a second virtual space (or second set of virtual spaces) without maintaining the persistent representation of the parameter, and upon return to the first virtual space (or first set of virtual spaces) the representation of the parameter stored for the first virtual space (or first set of virtual spaces) is restored to the character. In some of these implementations, character record 25 may store different representations of the same parameter (or similar parameters) for the first virtual space (or first set of virtual spaces) and the second virtual space (or second set of virtual spaces).

As should be appreciated from the foregoing, parameters of a character may be altered in one virtual space, for example, due to achievement within the virtual space. As a non-limiting example, in a first virtual space the character may gain and/or enhance a skill that may be useful in another virtual space and/or type of virtual space. Since the character parameter that represents this parameter (i.e., the skill) may be persistent between a plurality of virtual spaces, when the character moves from the virtual space in which the skill was gained and/or enhanced to another one of the virtual spaces in which the skill is a parameter, even if the character has passed through other virtual spaces in which the skill was not a parameter, the skill will be represented at the gained and/or augmented level. This may provide a continuity to the virtual spaces provided by system 10 not present in conventional systems that provide monolithic virtual spaces.

In some implementations, character inventory information may include information related to an amount of virtual currency currently possessed by the character, information related to objects in the possession and/or under the control of the character, and/or other information related to an inventory associated with the character. At least a portion of the character inventory information may be persistent between different virtual spaces and/or types of virtual spaces. This may enable the character to take her "possessions" with her between the various virtual spaces. In some cases, a given object in the inventory of a character, the character record 25 associated with the character may include a relatively complete description of the object (e.g., manifestation information associated with the object, etc.). In some cases, a given object in the inventory of a character may be associated with an object record that is separate from character record 25, and includes information that enables the object to be manifested within the virtual spaces. In these cases, character record 25 and/or the object record may reference each other in such a manner that the object is associated with the character as being in the character's inventory.

As is discussed in greater detail in U.S. patent application Ser. No. 12/249,154, which was incorporated by reference above, objects may be manifest within the virtual spaces solely on the basis of information stored in character record 25 and/or in object records. This may enable flexibility of the platform provided by system 10 in manifesting objects such that a given object may be manifested within a virtual spaces primarily based on the manifestation information included within the corresponding object record and/or character record 25 across a variety of virtual spaces and/or virtual space types. In other words, the information stored within an object record and/or character record 25 may enable an object to be manifested with virtual spaces provided by system 10 without being preconfigured within the space (and without the space being preconfigured for the object). Accordingly, the character inventory information included within character record 25 (in some cases in conjunction with an object record) may enable the character corresponding to the character record 25 to transport the object into at least a substantial set of the virtual spaces provided by system 10. This may provide an enhanced level of transportability for possessions of the character between different virtual spaces and/or types of virtual spaces in comparison with traditional systems that require objects to have been previously introduced within a virtual space before they can be possessed, manifested, and/or used in accordance with a character's commands.

In some implementations, character interface information may include information related to an interface provided to the user that enables the user to control a character within the virtual spaces. For example, the character interface information included in a given character record 25 may include information that configures an input device provided at client 16 to control the character that corresponds to the given character record in a predetermined manner. The information that configures the input device may include a mapping of the input device provided at client 16 to commands that can be input to system 10 to control the character in a predetermined manner. The input device may include, for example, a keyboard, a mouse, a joystick, a trackball, and/or other input devices.

In some implementations, the character interface information may include information that configures a display of information related to the character. For example, the character interface information may include information that configures a display provided to the user at client 16. This may include configuring one or more of the type of information that is displayed, the position of the information on a display, the size of the information on the display, and/or other manners of configuring a display of information related to the character.

In some implementations, the character interface information may include information that configures a graphical user interface related to the character. For example, the graphical user interface may display information related to the character and/or enable control of the character. Configuring a graphical user interface may include one or more of determining the size and/or location of displays of information related to the character, determining information related to the commands that can be input through the graphical user interface, determining the manner in which the commands that can be input through the graphical user interface are selected, and/or determining other parameters of the graphical user interface.

Although information storage 18 is illustrated in FIG. 1 as a single entity, this is for illustrative purposes only. In some embodiments, information storage 18 includes a plurality of informational structures that facilitate management and storage of the information related to the plurality of virtual spaces. Information storage 18 may include the physical storage elements for storing the information related to the virtual spaces, users of system 10, the characters, and/or the information processing and storage assets that enable information storage 18 to manage, organize, and maintain the stored information. Information storage 18 may include a relational database, an object oriented database, a hierarchical database, a post-relational database, flat text files (which may be served locally or via a network), XML files (which may be served locally or via a network), and/or other information structures.

In some embodiments, in which information storage 18 includes a plurality of informational structures that are separate and discrete from each other. In such embodiments, system 10 may include a central information catalog (e.g., managed by storage module 12) that includes information related to the location of the space records, the user records, and/or the character records included in information storage 18 (e.g., network and/or file system addresses of individual space records). In some embodiments, the central information catalog may form a clearing house of information that enables users to initiate instances a chosen virtual space (e.g., to establish a server executing an instance of the chosen virtual space similar to server 14), to grant access of system 10 to users, to manifest characters within instances of the virtual spaces, and/or to perform other functionality within system 10. Accordingly, access to the information stored within the central information catalog may be provided to users and/or servers based on privileges (e.g., earned via monetary payment, administrative privileges, earned via previous gameplay, earned via membership in a community, etc.).

Server communication module 20 may facilitate communication between information storage 18 and server 14. In some embodiments, server communication module 20 enables this communication by formatting communication between information storage 18 and server 14. This may include, for communication transmitted from information storage 18 to server 14, generating markup elements (e.g., "tags") that convey the information stored in information storage 18, and transmitting the generated markup elements to server 14. For communication transmitted from server 14 to information storage 18, server communication module 20 may receive markup elements transmitted from server 14 to storage module 12 and may reformat the information for storage in information storage 18.

Server 14 may be provided remotely from storage module 12. Communication between server 14 and storage module 12 may be accomplished via one or more communication media. For example, server 14 and storage module 12 may communicate via a wireless medium, via a hard-wired medium, via a network (e.g., wireless or wired), and/or via other communication media. In some embodiments, server 14 may include a communication module 26, an instantiation module 28, a view module 30, a character module 31, and/or other modules. Modules 26, 28, 30, and 31 may be implemented in software; hardware; firmware; some combination of software, hardware, and/or firmware; and/or otherwise implemented. It should be appreciated that although modules 26, 28, 30, and/or 31 are illustrated in FIG. 1 as being co-located within a single unit (server 14), in some implementations, server 14 may include multiple units and modules 26, 28, 30, and/or 31 may be located remotely from the other modules.

Communication module 26 may be configured to communicate with storage module 12, and/or client 16. Communicating with storage module 12 and/or client 16 may include transmitting and/or receiving markup elements of the markup language. The markup elements received by communication module 26 may be implemented by other modules of server 14, or may be passed between storage module 12 and client 16 via server 14 (as server 14 serves as an intermediary therebetween). The markup elements transmitted by communication module 26 to storage module 12 or client 16 may include markup elements being communicated from storage module to client 16 (or vice versa), or the markup elements may include markup elements generated by the other modules of server 14.

Instantiation module 28 may be configured to execute one or more instances of one or more virtual spaces, such as an instance 32 of a virtual space present on server 14. Instantiation module 28 may execute instance 32 of the virtual space according to information received in markup element form from storage module 12. Instantiation module 28 may comprise an application that is configured to execute instances of virtual spaces based on information conveyed thereto in markup element form. The application may be capable of initiating execution of an instance of a virtual space without accessing a local source of information (local to server 14) that describes various aspects of the configuration of the virtual space (e.g., manifestation information, space parameter information, etc.), or without making assumptions about such aspects of the configuration of the virtual space when initiating execution of the virtual space. Instead, such information may be obtained by instantiation module 28 from the markup elements communicated to server 14 from storage module 12. This may provide one or more enhancements over systems in which an application running on a server executes an instance of a virtual space dictates aspects of the virtual space (e.g., in "World of Warcraft"), such as manifestation information and/or space parameter information, or makes assumptions about such aspects. For example, the application included in instantiation module 28 may be capable of executing instances of a wider variety of "types" of virtual spaces (e.g., virtual worlds, games, 3-D spaces, 2-D spaces, spaces with different views, first person spaces, birds-eye spaces, real-time spaces, turn based spaces, etc.).

Instance 32 may be characterized as a simulation of the virtual space that is being executed on server 14 by instantiation module 28. The simulation may include determining in real-time the positions, structure, and manifestation of objects, unseen forces, and topography within the virtual space according to the topography, manifestation, and space parameter information that corresponds to the virtual space. As has been discussed above, various portions of the content that make up the virtual space embodied in instance 32 may be identified in the markup elements received from storage module 12 by reference. In such implementations, instantiation module 28 may be configured to access the content at the access location identified (e.g., at network asset 22, as described above) in order to account for the nature of the content in instance 32.

As instance 32 is maintained by instantiation module 28 on server 14, and the position, structure, and manifestation of objects, unseen forces, and topography within the virtual space varies, instantiation module 28 may implement an instance memory module 34 to store information related to the present state of instance 32. Instance memory module 34 may be provided locally to server 14 (e.g., integrally with server 14, locally connected with server 14, etc.), or instance memory module 34 may be located remotely from server 14 and an operative communication link may be formed therebetween.

View module 30 may be configured to implement instance 32 to determine a view of the virtual space. The view of the virtual space may be from a fixed location or may be dynamic (e.g., may track an object). In some implementations, a character associated with client 16 (e.g., an avatar) may be included within instance 32. In these implementations, the location of the character within instance 32 may influence the view determined by view module 30 (e.g., track with the position of the character, be taken from the perspective of the character, etc.). The view determined by view module 30 may be determined for a variety of different perspectives (e.g., a bird's eye view, an elevation view, a first person view, etc.). The view may be a 2-dimensional view or a 3-dimensional view. These and/or other aspects of the view may be determined for the virtual space based on information stored in a space record 24 for the virtual space and provided from storage module 12 via markup elements (e.g., as space parameter information). Determining the view may include determining the identity, shading, size (e.g., due to perspective), motion, and/or position of objects, effects, and/or portions of the topography that would be present in a rendering of the view.

View module 30 may generate a plurality of markup elements that describe the view based on the determination of the view. The plurality of markup elements may describe identity, shading, size (e.g., due to perspective), and/or position of the objects, effects, and/or portions of the topography that should be present in a rendering of the view. The markup elements may describe the view "completely" such that the view can be formatted for viewing by the user by simply assembling the content identified in the markup elements according to the attributes of the content provided in the markup elements. In such implementations, assembly alone may be sufficient to achieve a display of the view of the virtual space, without further processing of the content (e.g., to determine motion paths, decision-making, scheduling, triggering, etc.).

In some embodiments, the markup elements generated by view module 30 that describe the view identify content (e.g., visual content, audio content, etc.) to be included in the view by reference only. For example, as was the case with mark-up elements transmitted from storage module 12 to server 14, the markup elements generated by view module 30 may identify content by a reference to an access location. The access location may include a URL that points to a network location. The network location identified by the access location may be associated with a network asset (e.g., network asset 22). For instance, the access location may include a network URL address (e.g., an internet URL address, etc.) at which network asset 22 may be accessed.

According to various embodiments, in generating the view, view module 30 may manage various aspects of content included in views determined by view module 30, but stored remotely from server 14 (e.g., content referenced in markup elements generated by view module 30). Such management may include re-formatting content stored remotely from server 14 to enable client 16 to convey the content (e.g., via display, etc.) to the user. For example, in some implementations, client 16 may be executed on a relatively limited platform (e.g., a portable electronic device with limited processing, storage, and/or display capabilities). Server 14 may be informed of the limited capabilities of the platform (e.g., via communication from client 16 to server 14) and, in response, view module 30 may access the content stored remotely in network asset 22 to re-format the content to a form that can be conveyed to the user by the platform executing client 16 (e.g., simplifying visual content, removing some visual content, re-formatting from 3-dimensional to 2-dimensional, etc.). In such implementations, the reformatted content may be stored at network asset 22 by over-writing the previous version of the content, stored at network asset 22 separately from the previous version of the content, stored at a network asset 36 that is separate from network asset 22, and/or otherwise stored. In implementations in which the re-formatted content is stored separately from the previous version of the content (e.g., stored separately at network asset 22, stored at network asset 24, cached locally by server 14, etc.), the markup elements generated by view module 30 for client 16 reflect the access location of the re-formatted content.

As was mentioned above, in some embodiments, view module 30 may adjust one or more aspects of a view of instance 32 based on communication from client 16 indicating that the capabilities of client 16 may be limited in some manner (e.g., limitations in screen size, limitations of screen resolution, limitations of audio capabilities, limitations in information communication speeds, limitations in processing capabilities, etc.). In such embodiments, view module 30 may generate markup elements for transmission that reduce (or increase) the complexity of the view based on the capabilities (and/or lack thereof) communicated by client 16 to server 14. For example, view module 30 may remove audio content from the markup elements, view module 30 may generate the markup elements to provide a two dimensional (rather than a three dimensional) view of instance 32, view module 30 may reduce, minimize, or remove information dictating motion of one or more objects in the view, view module 30 may change the point of view of the view (e.g., from a perspective view to a bird's eye view), and/or otherwise generate the markup elements to accommodate client 16. In some implementations, these types of accommodations for client 16 may be made by server 14 in response to commands input by a user on client 16 as well as or instead of based on communication of client capabilities by client 16. For example, the user may input commands to reduce the load to client 16 caused by displaying the view to improve the quality of the performance of client 16 in displaying the view, to free up processing and/or communication capabilities on client 16 for other functions, and/or for other reasons.

From the description above it should be apparent that as view module 30 "customizes" the markup elements that describe the view for client 16, a plurality of different versions of the same view may be described in markup elements that are sent to different clients with different capabilities, settings, and/or requirements input by a user. This customization by view module 30 may enhance the ability of system 10 to be implemented with a wider variety of clients and/or provide other enhancements.

Character module 31 may receive information related to a character introduced into instance 32 by the user (e.g., via client 16). The information may be implemented by instantiation module 28 and/or view module 30 in generating instance 32 and/or a view thereof The received information may include information received from client 16 and/or information storage 18. For example, in order to "enter" instance 32, client 16 may transmit a request to server 14 for access to instance 32. The request may include an identification that enables character module 31 to determine a character that should be manifested within instance 32 as a representation of the user. The identification may be information that identifies one or more of a user associated with the character, a user record corresponding to the user, the character, and/or a character record corresponding to the character. Determination of the character by character module 31 may include identifying a character record 25 from which information related to the character can be accessed. Character module 31 may then obtain information from the appropriate character record 25 that will enable instantiation module 28 to manifest the character within instance 32 and/or will enable view module 30 to determine the appropriate view of instance 32 for transmission to the client.

As has been set forth above, the information within character record 25 accessed by character module 31 may include one or more of manifestation information that is specific to the character, character parameter information, character inventory information, character interface information, and/or other information related to the character. At least some of the information within character record 25 may be persistent between instance 32 and instances of other virtual spaces. However, this may not be the case for some of the information within character record 25. Some of the information within character record may be specific to the virtual space of instance 32 (and/or some group of virtual spaces of which the virtual space of instance 32 is a part). For example, aspects of the visual representation of the character may be specific to the virtual space and/or group of virtual spaces, objects and/or currency in the inventory of the character may be specific to the virtual space and/or group of virtual spaces, a score, a skill, a skill level, a permission, a social connection, and/or other parameters of the character may-be specific to the virtual space and/or group of virtual spaces, and/or other information included in character record 25 may be specific to the virtual spaces and/or group of virtual spaces.

In some implementations, character module 31 may obtain information from character record 25 by transmitting a request to storage module 12 that identifies the character record 25 including information related to the character that is going to be manifested within instance 32. This request may include an identification of the virtual space of instance 32. In response to the request, storage module 12 may transmit character record 25 and/or some portion thereof (e.g., including information relevant to the virtual space identified in the request) back to character module 31.

According to various embodiments of the invention, if a character is being introduced into a virtual space (e.g., manifested into an instance of the virtual space) for the first time, character record 25 may not include all of the information necessary to manifest the character. For example, the virtual space may be configured such that some of the information within character record 25 is specific to the virtual space. If the character has not been introduced into the virtual space, then this information may not yet have been entered to character record 25. In such cases, character module 31 may enable the user to configure the character for the virtual space.

By way of non-limiting example, a virtual space may feature aspects of visual representations of the characters present therein (e.g., may have specialized clothing, may require characters to be represented as a one of one or more specific types of creatures (e.g., a dragon, an elf, a wizard, soldier, etc.), etc.). Upon entry into an instance of the virtual space, character module 31 may assign default values for these aspects of the visual representation of the character. These default values may be written to character record 25 that corresponds to the character. Character module 31 may present an interface to the user (e.g., via client 16) that enables the user to change and/or configure these aspects of the visual representation of the character of the user in a customizable manner (rather than the default values). These customized aspects of the visual representation may be written to character record 25. Writing the configured information (whether default or customized) to character record 25 enables the information to be retrieved if the character leaves the instance of the virtual world and then returns to the virtual world at some future time such that the character will not have to be reconfigured for future entries into the virtual space.

It should be appreciated that the example of configuring, and writing to character record 25, aspects of the visual representation of the character that are specific to the virtual space (or some group of virtual spaces of which this group of virtual spaces is a part) is intended solely for illustrative purposes. Other information (e.g., other manifestation information, character inventory information, character parameter information, character interface information, etc.) related to the character may be determined by character module 31 (based on defaults and/or customization) upon entry of the character into the virtual space for the first time in a manner that is similar to or substantially the same as the configuration and storage of the aspects of the visual representation of the character discussed above.

In some implementations, information related to the character may change and/or evolve during the presence of the character within instance 32. For example, the appearance of the character may change over time to represent a maturation of the character, the character may acquire and/or enhance one or more skills, the character may obtain currency and/or objects, a score associated with the character may changed, manifestation information associated with the character may change (e.g., the character may grow, become injured, get stronger, etc.), the character may gain a permission, the character may make a new social connection or enhance an existing social connection, and/or other information associated with the character may change. These changes may happen spontaneously within instance 32 (e.g., instance 32 may cause the character to mature over time), may be caused by gameplay within instance 32, may be caused by customization and/or configuration of the user (via client 16), and/or may have other causes. Character module 31 may manage the storage of these changes in character record 25. These changes may be stored within character record 25 so that if the character leaves instance 32 and enters another virtual space, information related to the character that is persistent between instance 32 and the other virtual space will reflect the changes in the other virtual space. If the information related to the character that is changed within instance 32 is not persistent between instance 32 and the other virtual space, then these changes will be stored within character record 25 until the character re-enters instance 32 and/or an instance of some other virtual space for which the changed information is persistent.

In some embodiments, client 16 provides an interface to the user that includes a view display 38, a user interface display 40, an input interface 42, and/or other interfaces that enable interaction of the user with the virtual space. Client 16 may include a server communication module 44, a view display module 46, an interface module 48, and/or other modules. Client 16 may be executed on a computing platform that includes a processor that executes modules 44 and 46, a display device that conveys displays 38 and 40 to the user, and provides input interface 42 to the user to enable the user to input information to system 10 (e.g., a keyboard, a keypad, a switch, a knob, a lever, a touchpad, a touchscreen, a button, a joystick, a mouse, a trackball, etc.). The platform may include a desktop computing system, a gaming system, or more portable systems (e.g., a mobile phone, a personal digital assistant, a hand-held computer, a laptop computer, etc.). In some embodiments, client 16 may be formed in a distributed manner (e.g., as a web service). In some embodiments, client 16 may be formed in a server. In these embodiments, a given virtual space instanced on server 14 may include one or more objects that present another virtual space (of which server 14 becomes the client in determining the views of the first given virtual space).

Server communication module 44 may be configured to receive information related to the execution of instance 32 on server 14 from server 14. For example, server communication module 44 may receive markup elements generated by storage module 12 (e.g., via server 14), view module 30, and/or other components or modules of system 10. The information included in the markup elements may include, for example, view information that describes a view of instance 32 of the virtual space, interface information that describes various aspects of the interface provided by client 16 to the user, and/or other information. Server communication module 44 may communicate with server 14 via one or more protocols such as, for example, WAP, TCP, UDP, and/or other protocols. The protocol implemented by server communication module 44 may be negotiated between server communication module 44 and server 14.

View display module 46 may be configured to format the view described by the markup elements received from server 14 for display on view display 38. Formatting the view described by the markup elements may include assembling the view information included in the markup elements. This may include providing the content indicated in the markup elements according to the attributes indicated in the markup elements, without further processing (e.g., to determine motion paths, decision-making, scheduling, triggering, etc.). As was discussed above, in some implementations, the content indicated in the markup elements may be indicated by reference only. In such implementations, view display module 46 may access the content at the access locations provided in the markup elements (e.g., the access locations that reference network assets 22 and/or 36, or objects cached locally to server 14). In some of these implementations, view display module 46 may cause one or more of the content accessed to be cached locally to client 16, in order to enhance the speed with which future views may be assembled. The view that is formatted by assembling the view information provided in the markup elements may then be conveyed to the user via view display 38.

As has been mentioned above, in some implementations, the capabilities of client 16 may be relatively limited. In some such implementations, client 16 may communicate these limitations to server 14, and the markup elements received by client 16 may have been generated by server 14 to accommodate the communicated limitations. However, in some such implementations, client 16 may not communicate some or all of the limitations that prohibit conveying to the user all of the content included in the markup elements received from server 14. Similarly, server 14 may not accommodate all of the limitations communicated by client 16 as server 14 generates the markup elements for transmission to client 16. In these instances, view display module 46 may be configured to exclude or alter content contained in the markup elements in formatting the view. For example, view display module 46 may disregard audio content if client 16 does not include capabilities for providing audio content to the user. As another example, if client 16 does not have the processing and/or display resources to convey movement of objects in the view, view display module 46 may restrict and/or disregard motion dictated by motion information included in the markup elements.

Interface module 48 may be configured to configure various aspects of the interface provided to the user by client 16. For example, interface module 48 may configure user interface display 40 and/or input interface 42 according to the interface information provided in the markup elements. User interface display 40 may enable display of the user interface to the user. In some implementations, user interface display 40 may be provided to the user on the same display device (e.g., the same screen) as view display 38. As was discussed above, the user interface configured on user interface display 40 by interface module 48 may enable the user to input communication to other users interacting with the virtual space, input actions to be performed by one or more objects within the virtual space, provide information to the user about conditions in the virtual space that may not be apparent simply from viewing the space, provide information to the user about one or more objects within the space, input commands and/or request for information related to a character in instance 32 that is associated with the user, and/or provide for other interactive features for the user. In some implementations, the markup elements that dictate aspects of the user interface may include markup elements generated at storage module 12 (e.g., at startup of instance 32) and/or markup elements generated by server 14 (e.g., by view module 30) based on the information conveyed from storage module 12 to server 14 via markup elements. This information may include information from within space record 24, character record 25, and/or other records (e.g., user records) stored in storage module 12.

In some implementations, interface module 48 may configure input interface 42 according to information received from server 14 via markup elements. For example, interface module 48 may map the manipulation of input interface 42 by the user into commands to be input to system 10 based on a predetermined mapping that is conveyed to client 16 from server 14 via markup elements. The predetermined mapping may include, for example, a key map and/or other types of interface mappings (e.g., a mapping of inputs to a mouse, a joystick, a trackball, and/or other input devices). If input interface 42 is manipulated by the user, interface module 48 may implement the mapping to determine an appropriate command (or commands) that correspond to the manipulation of input interface 42 by the user. Similarly, information input by the user to user interface display 40 (e.g., via a command line prompt) may be formatted into an appropriate command for system 10 by interface module 48. In some implementations, the availability of certain commands, and/or the mapping of such commands may be provided based on privileges associated with a user manipulating client 16 (e.g., as determined from a login). For example, a user with administrative privileges, premium privileges (e.g., earned via monetary payment), advanced privileges (e.g., earned via previous game-play), and/or other privileges may be enabled to access an enhanced set of commands. These commands formatted by interface module 48 may be communicated to server 14 by server communication module 44.

Upon receipt of commands from client 16 that include commands input by the user (e.g., via communication module 26), server 14 may enqueue for execution (and/or execute) the received commands. The received commands may include commands related to the execution of instance 32 of the virtual space. For example, the commands may include display commands (e.g., pan, zoom, etc.), object manipulation commands (e.g., to move one or more objects in a predetermined manner), character action commands (e.g., for the character associated with client 16 to perform a predetermined action), communication commands (e.g., to communicate with other users interacting with the virtual space), information requests, and/or other commands. Instantiation module 38 may execute the commands in the virtual space by manipulating instance 32 of the virtual space. The manipulation of instance 32 in response to the received commands may be reflected in the view generated by view module 30 of instance 32, which may then be provided back to client 16 for viewing. Thus, commands input by the user at client 16 enable the user to interact with the virtual space without requiring execution or processing of the commands on client 16 itself.

Figure 2:
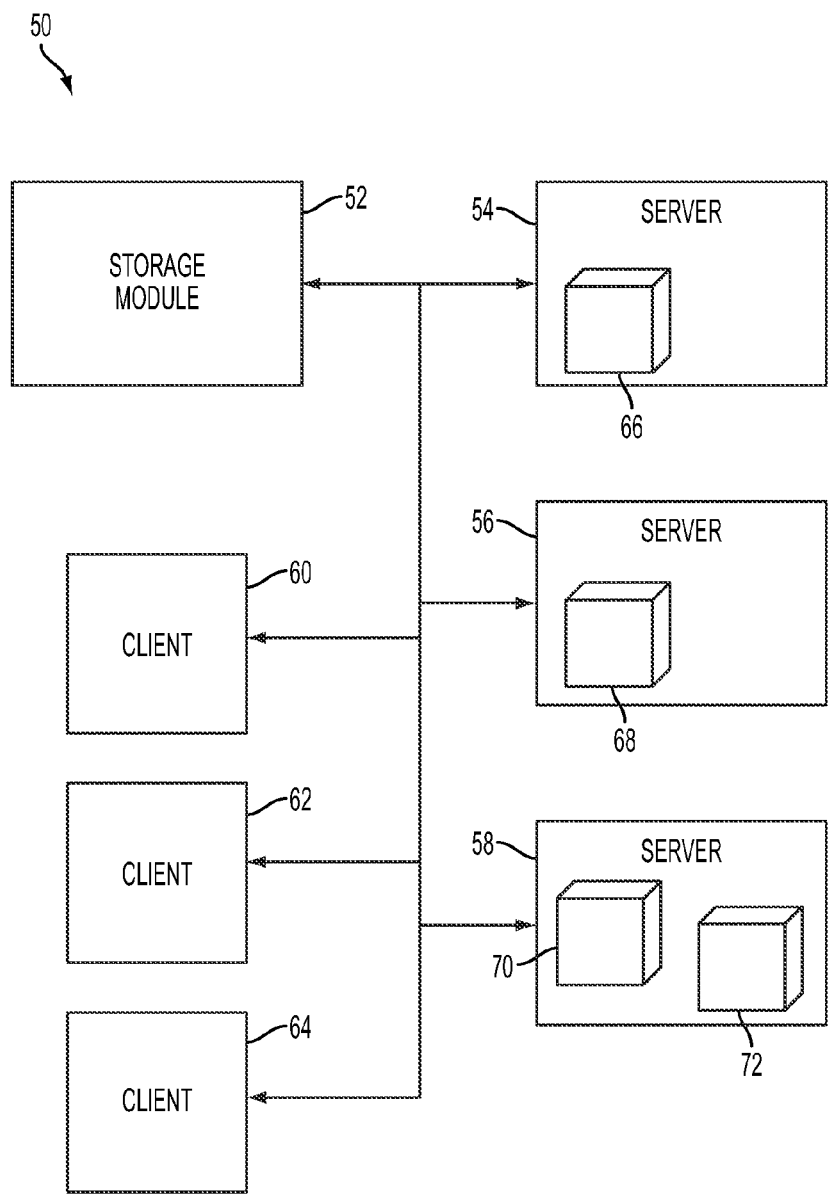
FIG. 2 illustrates a system configured to provide one or more virtual spaces that may be accessible to users, according to one or more embodiments of the invention.

It should be appreciated that system 10 as illustrated in FIG. 1 is not intended to be limiting in the numbers of the various components and/or the number of virtual spaces being instanced. For example, FIG. 2 illustrates a system 50, similar to system 10, including a storage module 52, a plurality of servers 54, 56, and 58, and a plurality of clients 60, 62, and 64. Storage module 52 may perform substantially the same function as storage module 12 (shown in FIG. 1 and described above). Servers 54, 56, and 58 may perform substantially the same function as server 14 (shown in FIG. 1 and described above). Clients 60, 62, and 64 may perform substantially the same function as client 16 (shown in FIG. 1 and described above).

Storage module 52 may store information related to a plurality of virtual spaces, and may communicate the stored information to servers 54, 56, and/or 58 via markup elements of the markup language, as was discussed above. Servers 54, 56, and/or 58 may implement the information received from storage module 52 to execute instances 66, 68, 70, and/or 72 of virtual spaces. As can be seen in FIG. 2, a given server, for example, server 58, may be implemented to execute instances of a plurality of virtual spaces (e.g., instances 70 and 72). Clients 60, 62, and 64 may receive information from servers 54, 56, and/or 58 that enables clients 60, 62, and/or 64 to provide an interface for users thereof to one or more virtual spaces being instanced on servers 54, 56, and/or 58. The information received from servers 54, 56, and/or 58 may be provided as markup elements of the markup language, as discussed above.

Due at least in part to the implementation of the markup language to communicate information between the components of system 50, it should be appreciated from the foregoing description that any of servers 54, 56, and/or 58 may instance any of the virtual spaces stored on storage module 52. The ability of servers 54, 56, and/or 58 to instance a given virtual space may be independent, for example, from the topography of the given virtual space, the manner in which objects and/or forces are manifest in the given virtual space, and/or the space parameters of the given virtual space. This flexibility may provide an enhancement over conventional systems for instancing virtual spaces, which may only be capable of instancing certain "types" of virtual spaces. Similarly, clients 60, 62, and/or 64 may interface with any of the instances 66, 68, 70, and/or 72. Such interface may be provided without regard for specifics of the virtual space (e.g., topography, manifestations, parameters, etc.) that may limit the number of "types" of virtual spaces that can be provided for with a single client in conventional systems. In conventional systems, these limitations may arise as a product of the limitations of platforms executing client 16, limitations of client 16 itself, and/or other limitations.

In some embodiments, system 10 may enable the user to create a virtual space. In such embodiments, the user may select a set of characteristics of the virtual space on client 16 (e.g., via user interface display 48 and/or input interface 42). The characteristics selected by the user may include characteristics of one or more of a topography of the virtual space, the manifestation in the virtual space of one or more objects and/or unseen forces, an interface provided to users to enable the users to interact with the new virtual space, space parameters associated with the new virtual space, and/or other characteristics of the new virtual space.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to provide a virtual space that is accessible to one or more users, the system comprising:
   a first server configured to execute an instance of a first virtual space and further configured to determine views of the first virtual space from the executed instance, wherein the first virtual space is a simulated physical space that has a topography, expresses real-time interaction by the one or more users, and includes one or more objects positioned within the topography that are capable of experiencing locomotion within the topography;
   a second server configured to execute an instance of a second virtual space and further configured to determine views of the second virtual space from the executed instance, wherein the second virtual space is a simulated physical space that has a topography, expresses real-time interaction by the one or more users, and includes one or more objects positioned within the topography that are capable of experiencing locomotion within the topography, and wherein the first virtual space is of a type comprising one or more of a two-dimensional space, a three-dimensional space, a social space, a first-person space, a third-person space, an action gaming space, a role-playing space, a real-time space, or a turn-based space, and wherein the second virtual space is of a different type than the first virtual space;
   a first client configured to receive a view of the first virtual space from the first server, and wherein the first client is further configured to provide the received view to a user;
   a second client configured to receive a view of the second virtual space from the second server, wherein the second client is further configured to provide the view of the second virtual space to the user; and
   a storage module remote from the first client and the second client that is configured to store information related to a first character associated with the user, wherein the storage module is further configured to store information related to a second character associated with the user, wherein the first server enables the first character to be manifested within the first virtual space based on the information related to the first character stored in the storage module, wherein the second server enables the second character to be manifested within the second virtual space based on the information related to the second character stored in the storage module,
   wherein the first client enables the user to input commands to the first server that control the first character within the instance of the first virtual space, wherein the second client further enables the user to input commands to the second server that control the second character within the instance of the second virtual space, and wherein at least a portion of the information stored in the storage module is persistent between the first virtual space and the second virtual space.

2. The system of claim 1, wherein the first client and the second client are executed on a single computing platform.

3. The system of claim 1, wherein the information related to the first character that is stored by the storage module comprises one or more preferences of the user that are persistent between the first virtual space and the second virtual space.

4. The system of claim 1, wherein the information related to the first character that is stored by the storage module comprises one or more preferences of the user that are different between the first virtual space and the second virtual space.

5. The system of claim 1, wherein the information related to the first character that is stored by the storage module comprises one or more of manifestation information that is specific to the character, character parameter information, or character inventory information.

6. The system of claim 5, wherein the information related to the first character that is stored by the storage module comprises manifestation information that is specific to the first character, wherein the manifestation information that is specific to the first character comprises one or more of information related to the visual representation of the first character, information related to the strength, size, weight, and/or movement of the first character, or one or more sonic characteristics of the first character, and wherein at least a portion of the manifestation information is persistent between the first virtual space and the second virtual space.

7. The system of claim 5, wherein the information related to the first character that is stored by the storage module comprises character parameter information, wherein the character parameter information comprises one or more of a skill level of the first character, a status of the first character, a permission of the first character, or a social connection of the first character, and wherein at least a portion of the character parameter information is persistent between the first virtual space and the second virtual space.

8. The system of claim 5, wherein the information related to the first character that is stored by the storage module comprises character inventory information, wherein the character inventory information comprises one or both of information related to an amount of virtual currency possessed by the first character, and/or information related to objects in the possession of the first character, and wherein at least a portion of the character inventory information is persistent between the first virtual space and the second virtual space.

9. An information storage system configured to store information related to characters within virtual spaces, the information storage system comprising:
   character storage that stores a plurality of character records including a first character record and a second character record,
      wherein the character storage is configured to receive a request for information included within one of the stored character records from a first server remote from the character storage that is executing an instance of a first virtual space, wherein the first virtual space is a simulated physical space that has a topography, expresses real-time interaction by the one or more users, and includes one or more objects positioned within the topography that are capable of experiencing locomotion within the topography, wherein the information requested from the character storage includes information that enables the first server to manifest a first character that corresponds to the requested character record in the instance of the first virtual space being executed by the first server,
      wherein the character storage is further configured to receive a second request for information included within one of the stored character records from a second server remote from the character storage that is executing an instance of a second virtual space, wherein the second virtual space is a simulated physical space that has a topography, expresses real-time interaction by the one or more users, and includes one or more objects positioned within the topography that are capable of experiencing locomotion within the topography, wherein the information requested from the character storage through the second request includes information that enables the second server to manifest a second character that corresponds to the requested character record in the instance of the second virtual space being executed by the second server, wherein the first virtual space is of a type comprising one or more of a two-dimensional space, a three-dimensional space, a social space, a first-person space, a third-person space, an action gaming space, a role-playing space, a real-time space, or a turn-based space, and wherein the second virtual space is of a different type than the first virtual space, and wherein at least a portion of the information requested from the character storage is persistent between the first virtual space and the second virtual space;
   the first character record including information related to a first character that enables the first character to be manifested within the first virtual space;
   the second character record including information related to a second character that enables the second character to be manifested within the second virtual space;
   the character storage being remote from a client that enables a user to access and control an instance of the first virtual space being executed by the first server or an instance of the second virtual space being executed by the second server.

10. The system of claim 9, wherein the information related to the first character included in the first character record comprises one or more user preferences that are persistent between the first virtual space and the second virtual space.

11. The system of claim 9, wherein the information related to the first character included in the first character record comprises one or more user preferences that are different between the first virtual space and the second virtual space.

12. The system of claim 9, wherein the information related to the first character that is included in the first character record comprises one or more of manifestation information that is specific to the first character, character parameter information, or character inventory information.

13. The system of claim 12, wherein the information related to the first character that is included in the first character record comprises manifestation information that is specific to the first character, wherein the manifestation information that is specific to the first character comprises one or more of information related to the visual representation of the first character, information related to the strength, size, weight, and/or movement of the first character, or one or more sonic characteristics of the first character, and wherein at least a portion of the manifestation information is persistent between the first virtual space and the second virtual space.

14. The system of claim 12, wherein the information related to the first character that is included in the first character record comprises character parameter information, wherein the character parameter information comprises one or more of a skill level of the first character, a status of the first character, a permission of the first character, or a social connection of the first character, and wherein at least a portion of the character parameter information is persistent between the first virtual space and the second virtual space.

15. The system of claim 12, wherein the information related to the first character that is included in the first character record comprises character inventory information, wherein the character inventory information comprises one or both of information related to an amount of virtual currency possessed by the first character, and/or information related to objects in the possession of the first character, and wherein at least a portion of the character inventory information is persistent between the first virtual space and the second virtual space.

16. A server configured to execute instances of a plurality of different virtual spaces, the server comprising:
   one or more processors configured to execute computer program modules, the computer program modules comprising:
      an instantiation module that receives information related to a first virtual space, which is one of the plurality of different virtual spaces, from remote information storage and implements the received information to execute an instance of the first virtual space, wherein a virtual space is a simulated physical space that has a topography, expresses real-time interaction by the one or more users, and includes one or more objects positioned within the topography that are capable of experiencing locomotion within the topography, wherein the instantiation module further receives secondary information related to a second virtual space and implements the received secondary information to execute an instance of the second virtual space, wherein the first virtual space is of a type comprising one or more of a two-dimensional space, a three-dimensional space, a social space, a first-person space, a third-person space, an action gaming space, a role-playing space, a real-time space, or a turn-based space, and wherein the second virtual space is of a different type than the first virtual space;

a view module that implements the instance of the first virtual space to determine a view of the first virtual space, and generates view information that describes the view of the first virtual space for transmission to a client that generates a display of the view of the first virtual space for a user by assembling the view information, wherein the view module further implements the instance of the second virtual space to determine a view of the second virtual space, and generates view information that describes the view of the second virtual space for transmission to the client that generates a display of the view of the second virtual space for the user; and a character module that receives information related to a first character associated with the user from information storage that is located remotely from the client, wherein the information received by the character module enables the instantiation module to manifest the first character within the first virtual space executed by the instantiation module such that the first character is controllable by the user via the client, wherein the character module further receives secondary information related to a second character associated with the user from information storage, wherein the secondary information enables the instantiation module to manifest the second character within the second virtual space, and wherein at least a portion of the information related to the first character is persistent between the first virtual space and the second virtual space.

17. The server of claim 16, wherein the information related to the first character that is received by the character module comprises one or more preferences of the user that are persistent between the first virtual space and the second virtual space.

18. The server of claim 16, wherein the information related to the first character that is received by the character module comprises one or more preferences of the user that are different between the first virtual space and the second virtual space.

19. The server of claim 16, wherein the information related to the first character that is received by the character module comprises one or more of manifestation information that is specific to the first character, character parameter information, or character inventory information.

20. The server of claim 19, wherein the information related to the first character that is received by the character module comprises manifestation information that is specific to the first character, wherein the manifestation information that is specific to the first character comprises one or more of information related to the visual representation of the first character, information related to the strength, size, weight, and/or movement of the first character, or one or more sonic characteristics of the first character, and wherein at least a portion of the manifestation information is persistent between the first virtual space and the second virtual space.

21. The server of claim 19, wherein the information related to the first character that is received by the character module comprises character parameter information, wherein the character parameter information comprises one or more of a skill level of the first character, a status of the first character, a permission of the first character, or a social connection of the first character, and wherein at least a portion of the character parameter information is persistent between the first virtual space and the second virtual space.

22. The server of claim 19, wherein the information related to the first character that is received by the character module comprises character inventory information, wherein the character inventory information comprises one or both of information related to an amount of virtual currency possessed by the first character, and/or information related to objects in the possession of the first character, and wherein at least a portion of the character inventory information is persistent between the first virtual space and the second virtual space.

* * * * *